(12) United States Patent
Jensvold et al.

(10) Patent No.: US 11,583,937 B2
(45) Date of Patent: Feb. 21, 2023

(54) TOOL BODY INCLUDING A DAMPING APPARATUS AND A MACHINING TOOL HAVING SUCH A TOOL BODY

(71) Applicant: SANDVIK INTELLECTUAL PROPERTY AB, Sandviken (SE)

(72) Inventors: Einar Jensvold, Jakobsli (NO); Einar Ottesen, Ranheim (NO); Audun Skjellnes, Trondheim (NO); Einar Sundseth, Trondheim (NO)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 816 days.

(21) Appl. No.: 16/337,384

(22) PCT Filed: Aug. 29, 2017

(86) PCT No.: PCT/EP2017/071656
§ 371 (c)(1),
(2) Date: Mar. 27, 2019

(87) PCT Pub. No.: WO2018/059861
PCT Pub. Date: Apr. 5, 2018

(65) Prior Publication Data
US 2021/0354205 A1 Nov. 18, 2021

(30) Foreign Application Priority Data
Sep. 28, 2016 (EP) ..................................... 16191181

(51) Int. Cl.
*B23B 29/02* (2006.01)
(52) U.S. Cl.
CPC ........ *B23B 29/022* (2013.01); *B23B 2250/12* (2013.01); *B23B 2250/16* (2013.01)

(58) Field of Classification Search
CPC . B23B 29/022; B23B 27/002; B23B 2250/16; B23B 2250/12; B23B 2260/068; B23B 2260/136; B23B 2240/21; B23C 5/003; B23C 2250/16; B23Q 11/0032; B23Q 11/0039; F16F 1/3835; F16F 1/38; F16F 1/376; F16F 1/36; F16F 1/371; F16F 1/3716; F16F 15/131; F16F 15/13107; F16F 15/126; F16F 15/1245; F16F 15/124
See application file for complete search history.

(56) References Cited

U.S. PATENT DOCUMENTS

2016/0067787 A1    3/2016  Giannetti

FOREIGN PATENT DOCUMENTS

| GB | 199661 A | 6/1923 |
|----|----------|--------|
| WO | 03/093696 | 11/2003 |

*Primary Examiner* — Ryan Rufo
(74) *Attorney, Agent, or Firm* — Corinne R. Gorski

(57) ABSTRACT

A tool body includes a damping apparatus having a damper mass body with an axial through bore and a central tube received in the through bore and surrounded by a cavity. An elastic element is arranged on each side of the damper mass body and provided with two socket-like portions extending axially through a central hole of two disc-like members clamping the elastic element therebetween. The socket-like portions project in a rest state of the elastic element extend axially beyond the respective axially directed side of the respective disc-like member and are in an assembled state of the tool body compressed for sealing the cavity with respect to the exterior.

8 Claims, 3 Drawing Sheets

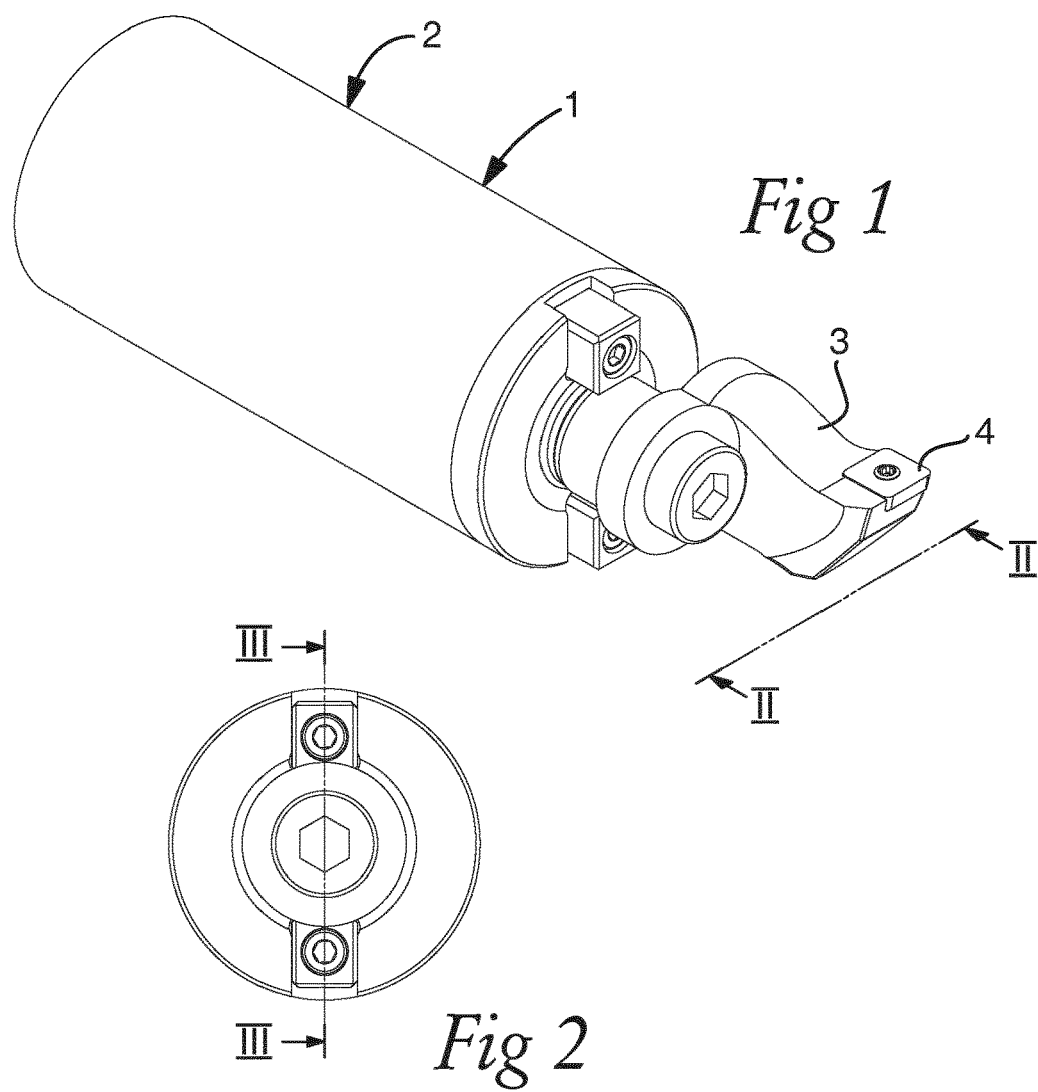
*Fig 1*
*Fig 2*
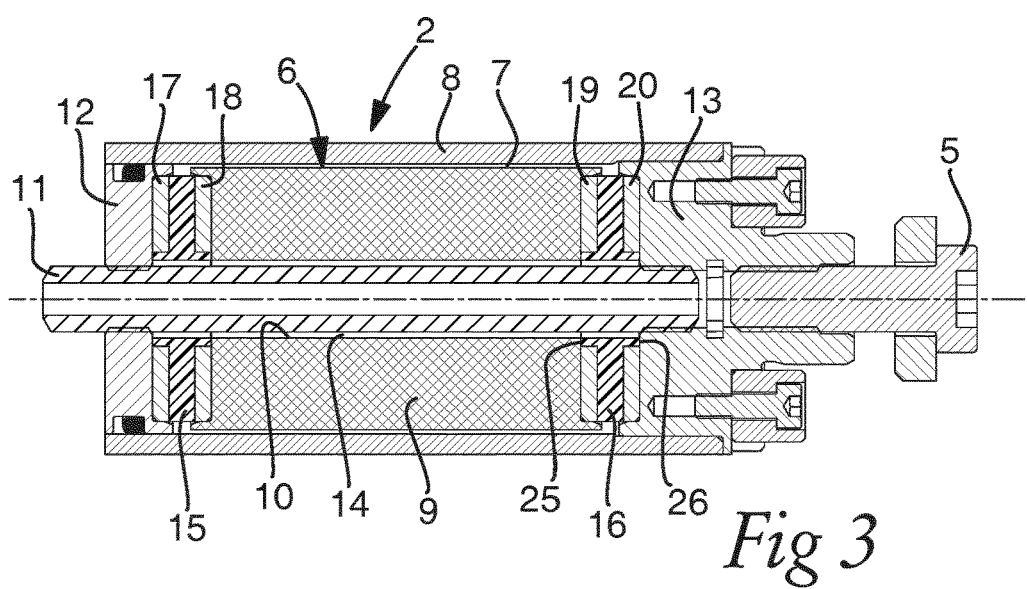
*Fig 3*

TOOL BODY INCLUDING A DAMPING APPARATUS AND A MACHINING TOOL HAVING SUCH A TOOL BODY

RELATED APPLICATION DATA

This application is a § 371 National Stage Application of PCT International Application No. PCT/EP2017/071656 filed Aug. 18, 2017 claiming priority to EP 16191181.3 filed Sep. 28, 2016.

TECHNICAL FIELD OF THE INVENTION

The present invention relates to a tool body including a damping apparatus for damping vibrations in a machining tool as well as a machining tool having such a tool body.

BACKGROUND ART

A tool body of the type defined in the introduction is known through WO 03/093696. This tool body comprises a damping apparatus including a cylindrical damping body and a cylindrical elastic element which is connected to a circular washer at each side. One of the washers is connected to the damping body and the other of the washers is connected to an end piece inside the tool body. The damping body and the elastic element with its washers each have an axial boring going there through and a central tube extends through the axial boring. In the boring, there is a space between the tube and the damping body so that a tube-shaped cavity is formed. This cavity is filled with damping fluid.

The tool body is provided with such a damping apparatus for damping radial and tangential forces applied on the tool body by the machining action of such a machining tool and by that improving the accuracy of the machining operation and prolonging the lifetime of the cutting edges of the tool. The damping effect of the damping apparatus is a result of an interaction between the damping body, which is of high density material, such as lead, and the elastic element. The elastic element is in this known tool mainly exposed to shear forces.

The cavity has to be sealed with respect to the exterior by preventing the damping fluid to escape from the cavity along the interface between the respective washer and the damping body and the end piece. An O-ring of rubber is manually fitted to bear between one washer and the damping body, and between one washer and the end piece. Such manual assembly means an inherent risk of a non-tight seal and a not neglectable contribution to production costs in the form of labour costs.

SUMMARY OF THE INVENTION

The object of the present invention is to provide a tool body of the type defined in the introduction being improved in at least some aspect with respect to such tool bodies already known.

This object is according to the invention obtained by providing such a tool body with, wherein each disc-like member has a central hole aligned with the central hole of the elastic element, each elastic element being provided with two socket-like portions extending axially through the central hole of each disc-like member, and wherein the socket-like portions project, in a rest state of the elastic element, axially beyond the respective said axially directed side of the respective disc-like member and which portions are when in an assembled state compressed by bearing under pretention onto the damper mass body and the tool body fixed part, respectively, to the seal cavity with respect to an exterior of the tool.

Thus, each disc-like member has a central hole aligned with the central hole of the elastic element, and each said elastic element (15, 16) is provided with two socket-like portions extending axially through the central hole (27) of a said disc-like member each, wherein the socket-like portions project in a rest state of the elastic element beyond the respective said axially directed side of the respective disc-like member and which portions are in an assembled state compressed by bearing under pretention onto the damper mass body and the tool body fixed part, respectively, and by that seal the cavity with respect to the exterior.

These features means that no O-rings are needed and the assembly of the damper apparatus may take place without any manual work, with results in lower production costs and above all a more reliable sealing of said cavity. It has only to be ensured that the damper mass body and the tool body fixed part connecting to each couple of disc-like members on opposite sides thereof have been moved that much towards each other that the projecting socket-like portions of the elastic element are compressed by the damper mass body and the tool body fixed part, respectively.

Another advantage of such a construction of the elastic elements is that the sealing action may be obtained closer to the cavity than when using O-rings, which need a grove to be applied in and for that sake have to be arranged at a certain distance to the central tube.

"Socket-like" is to be interpreted to include any shape similar as well as identical to a socket, for example a cylindrical, hollow protrusion.

"Disc-like" is here to be interpreted to include any shape of such a member similar as well as identical to a disc without any requirement of shape of the large surface thereof, although a circular such surface would mostly be preferred. These disc-like members are stiff and preferably made of metal.

The invention is not restricted to tool bodies and machining tools for any particular type of machining, and the tool body may for instance have members with cutting edges secured thereto in the form of cutting inserts for chip-removing machining of a work piece by turning, milling, drilling or boring. Thus, both rotating and non-rotating machining tools are comprised.

According to an embodiment of the invention the socket-like portions of the respective elastic element are the only members sealing the cavities with respect to the exterior. No other sealing means are required due to the reliable sealing action of these socket-like portions when compressed.

According to an embodiment of the invention the disc-like members of each couple of disc-like members are secured to each other by having the elastic element arranged therebetween secured to both of them while forming one single ring-like piece. This ring-like piece will accordingly have the shape of a thick washer or disc with socket-like portions that cover the walls of the central through-hole of the disc-like members and that project axially from both large sides of that piece. To have the disc-like members of each couple, the elastic element for the damping action and also the socket-like portions for the sealing action as one single piece will facilitate the assembly of the tool body.

According to an embodiment of the invention each elastic element is secured to the two disc-like members by an adhesive. When constructing said ring-like piece an adhesive may then be applied on the surface of a disc-like member to be directed towards the other disc-like member and the elastic material, such as an elastomer, be sprayed into the space between the disc-like members and cured while reacting with the adhesive for keeping the two disc-like members and the elastic element together as one single piece.

According to an embodiment of the invention the cavity is filled with a damping fluid in the form of oil.

According to an embodiment of the invention the central tube is configured to deliver coolant to a said machining tool in operation. In other words, the central tube is a coolant tube.

According to an embodiment of the invention, the damper mass body has a circular cylindrical shape with a through bore extending according to the central axis of the cylinder so formed. Such a shape of a damper mass body is preferred for a uniform vibration damping action of the damping apparatus.

According to an embodiment of the invention, the disc-like members have a circular cross-section.

The invention also relates to a machining tool, a device for sealing a cavity and a use of a tool body according to the appended claims directed to a machining tool, a device for sealing a cavity and a use of a tool body, respectively.

Other advantageous features as well as advantages of the present invention appear from the description following below.

BRIEF DESCRIPTION OF THE DRAWINGS

With reference to the appended drawings, below follows a specific description of embodiments of the inventions cited as examples.

In the drawings:

FIG. 1 shows a perspective view of a tool body according to an embodiment of the invention to which a member having a cutting insert for turning is secured, FIG. 2 is a view of the tool body shown in FIG. 1 without said member secured thereto in the direction of the arrow II in FIG. 1, FIG. 3 is a cross section view of the tool body shown in FIG. 1 along the line III-III in FIG. 2.

DETAILED DESCRIPTION OF EMBODIMENTS OF THE INVENTION

Figure 4:
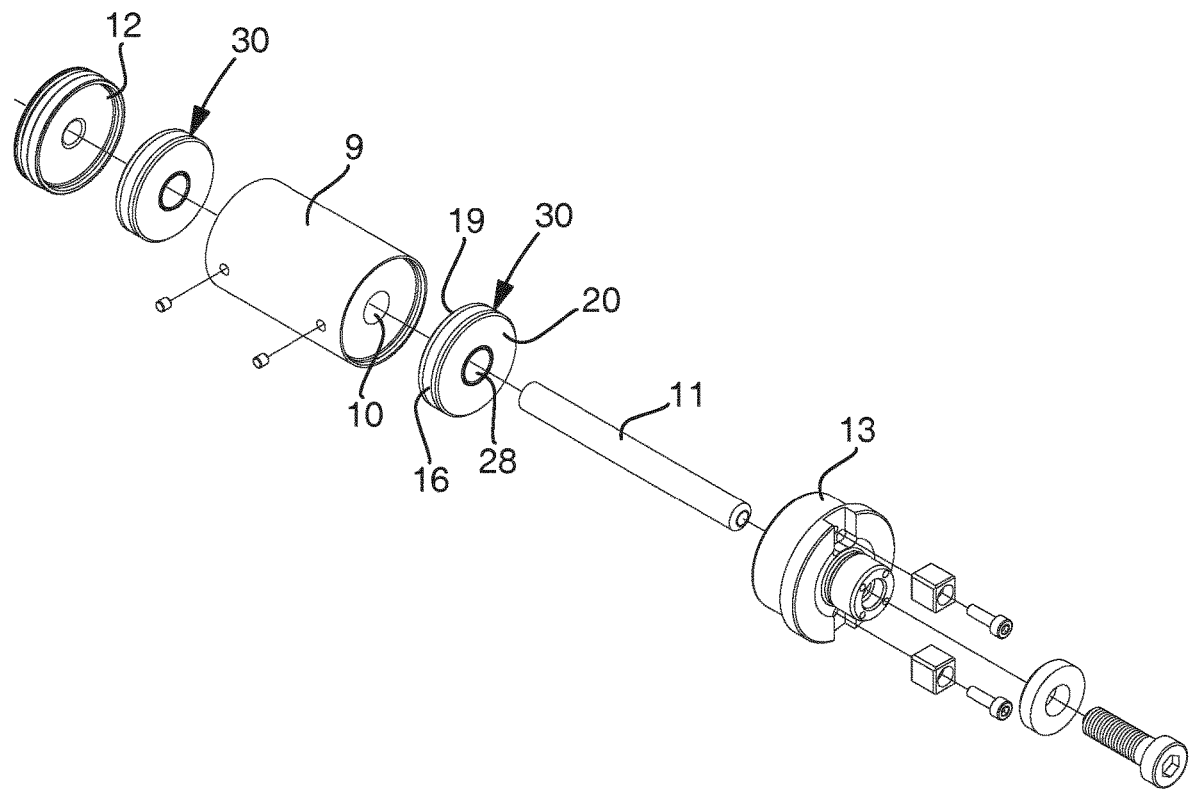
FIG. 4 is an exploded view of parts of the tool body shown in FIG. 1.

The construction of a tool body according to the first embodiment of the invention will now be disclosed while making reference simultaneously to FIGS. 1-4. A machining tool 1 for turning has besides a tool body 2 a member 3 with a cutting insert 4 secured to the tool body. It is pointed out that any other type of such member for chip-removing machining may be secured to an end 5 of the tool body for instead of turning carrying out machining in the form of for example milling, drilling or boring. The present invention is directed to the design of the tool body, which is the reason for having said member of the machining tool only shown in FIG. 1.

The tool body includes a damping apparatus 6 for damping vibrations generated by operation of a machining tool including the tool body. This damping apparatus is arranged inside an internal room 7 of the tool body defined by a casing 8. The damping apparatus has a damper mass body 9 of a high density material, such as lead. This body is provided with an axial through bore 10. A central tube 11 for transporting a cooling fluid to cutting edges of a machining tool in operation is rigidly connected to a tool body fixed part 12, 13 at each end thereof and extends through the through bore 10 while leaving a cavity 14 that surrounds the tube between the tube and the through bore such that the central tube and the damper mass body are separated. This cavity 14 contains a damping fluid, such as oil. Such a damping fluid may also be present in the space separating the damper mass body 9 and the internal wall of the casing 8.

Figure 5:
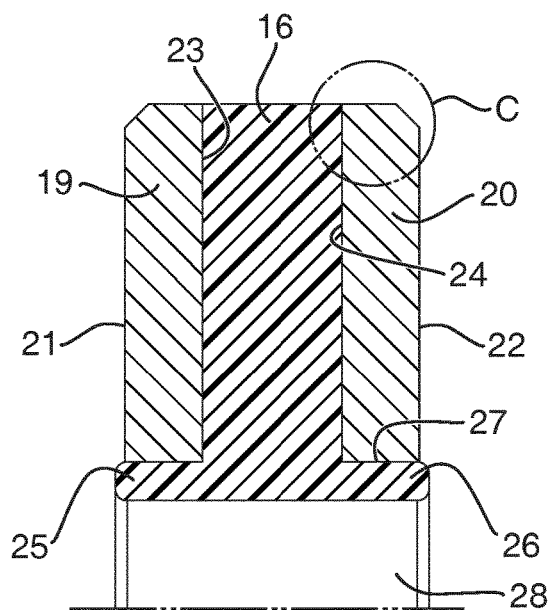
FIG. 5 is an enlarged cross section view of a part of a ring-like piece of the tool body shown in FIG. 3 in a rest state thereof before assembling the tool body.

At each axial end of the damper mass body 9 an elastic element 15, 16 is located to allow the damper mass body to dampingly interact, for example by shearing, with the respective tool body fixed part 12, 13. Rigid disc-like members 17-20, such as washers of steel, are arranged on each side of each elastic element for clamping the elastic element between two such disc-like members. These members 17-20 connect by an axially directed side 21, 22 (see FIG. 5) to the damper mass body and by the other to a tool body fixed part.

It is shown in FIG. 4 how one single ring-like piece 30 is formed by two disc-like members 19, 20 having an elastic element 16 arranged therebetween, and such a ring-like piece is formed by applying an adhesive on the sides 23, 24 of the disc-like members directed towards each other and then spraying or pouring an elastomer into the space separating these disc-like members for forming one single piece when the elastomer is cured. It is shown how the elastic element will by such a casting method be provided with two socket-like portions 25, 26 extending axially through a central hole 27 of each disc-like member 19, 20, aligned with a central hole 28 of the elastic element defined by the socket-like portions. The socket-like portions 25, 26 project in a rest state of the elastic element shown in FIG. 5 axially beyond the respective axially directed side 21, 22 of the respective disc-like member 19, 20.

In the shown embodiment, the central hole 27 of the disc-like members has a slightly larger diameter than the bore 10 through the damper mass body 9. The diameter of the hole 27 can be about two times the wall thickness of the socket-like portions 25, 26. The inner diameter of the socket-like portion 25, 26 can be the same as the diameter of the bore 10. Thus, the socket-like portions 25, 26 cover the walls of the central hole 27 and a passage for the tube 11 with constant diameter is provided through the ring-like piece and the damper mass body. The end surface of the socket-like portions 25, 26 that faces the damper mass body 9, abut the damper mass body 9 surrounding the bore 10.

When assembling the tool body, the tool body fixed parts 12, 13 at each end of the tool body will be moved axially towards the damper mass body 9, such as by turning these tool body fixed parts in threads so as to in an assembled state of the tool body move the opposite sides 21, 22 of each ring-like piece 30 to come to bear against axially directed sides of the damper mass body 9 and a tool body fixed part, respectively, and by that compress said socket-like portions 25, 26 of the elastic elements and cause them to bear under pretention onto the damper mass body and the tool body fixed part, respectively, and by that efficiently seal the cavity 14 surrounding the central tube with respect to the exterior and prevent damping fluid contained therein from leaving the cavity.

Figure 6:
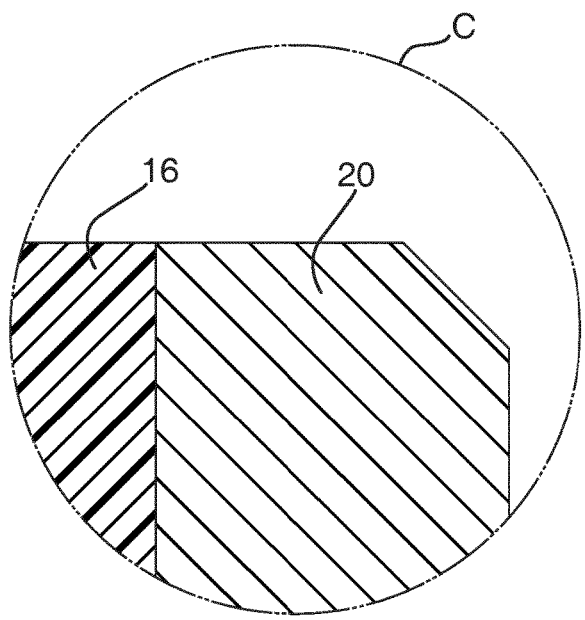
FIGS. 6 and 7 are enlarged views of the circle C in FIG. 5 for tool bodies according to two different embodiments of the invention.
Figure 7:
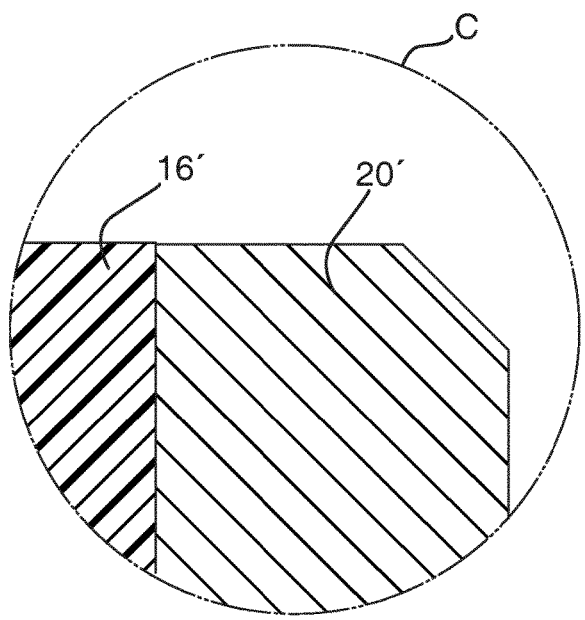

FIG. 6 illustrates an embodiment of the invention in which the outer diameter of the elastic element 16 is the same as the outer diameter of the disc-like members 20, whereas FIG. 7 shows an embodiment in which the outer diameter of the elastic element 16' is somewhat larger than the outer diameter of the disc-like member 20' in a rest state of the ring-like piece before assembling of the tool body. This will then result in also a radial compression of the elastic element upon assembly of the tool body, since the damper mass body and the tool body fixed parts have axial recesses with an inner diameter identical to the outer diameter of the disc-like members for receiving these therein in the assembled state as shown in FIG. 3, and the walls defining these recesses will then also reach in over the elastic element and cause a radial compression thereof.

The invention is of course not restricted to the embodiments thereof described above, but many possibilities to modifications thereof would be apparent to a person with skill in the art without departing from the scope of the invention as defined in the appended claims.

The shape of the socket-like portions may be another than the one shown in the figures and will be determined by the mould used when casting the elastic elements between the disc-like members.

The invention claimed is:

1. A machining tool comprising a tool body and a member with at least one cutting edge, the tool body including a damping apparatus for damping vibrations in the machining tool, wherein the damping apparatus is arranged in an internal room of the tool body and comprises:
    a damper mass body with an axial through bore;
    a central tube, which is rigidly connected to a first tool body fixed part at a first end thereof and a second tool body fixed at a second end thereof, wherein the central tube extends through the axial through bore such that a cavity is formed to surround the central tube between the central tube and the through bore such that the central tube and the damper mass body are separated, wherein the cavity contains a damping fluid;
    at each axial end of the damper mass body, an elastic element configured to allow the damper mass body to dampingly interact with the first and second tool body fixed part respectively, and each elastic element having a central hole through which the central tube extends; and
    a pair of rigid disc shaped members for each elastic element arranged to clamp a respective elastic element therebetween and which each pair of the disc shaped members connect, by a first axially directed side facing away from the elastic element, to the damper mass body and by a second axially directed side to a respective one of the first tool body fixed part or the second tool body fixed part, wherein each disc shaped member has a central hole aligned with the central hole of the elastic element, each elastic element being provided with two socket portions extending axially through the central hole of each disc shaped member of a respective pair of disc shaped members, and wherein the socket portions project, in a rest state of the elastic element, axially beyond the respective said first and second axially directed sides of the respective pair of disc shaped members and which portions are, when in an assembled state, compressed by bearing under pretention onto each of the damper mass body and the respective one of the first tool body fixed part or the second tool body fixed part to seal said cavity with respect to an exterior of the tool body.

2. The machining tool according to claim 1, wherein said socket portions of the respective elastic element are the only members sealing the cavity with respect to the exterior.

3. The machining tool according to claim 1, wherein the disc shaped members of each pair of disc shaped members are secured to each other by having the respective elastic element arranged therebetween secured to both disc shaped members of the pair of disc shaped members to form a single ring-shaped piece.

4. The machining tool according to claim 3, wherein each said elastic element is secured to the respective pair of disc shaped members by an adhesive.

5. The machining tool according to claim 1, wherein the damping fluid is oil.

6. The machining tool according to claim 1, wherein the central tube is configured to deliver coolant to the machining tool during operation thereof.

7. The machining tool according to claim 1, wherein the damper mass body has a cylindrical shape with the through bore extending along a center axis of the cylindrical shape.

8. The machining tool according to claim 1, wherein the disc shaped members have a circular cross-section.

* * * * *